(12) United States Patent
Arora (10) Patent No.: US 9,562,613 B2
(45) Date of Patent: Feb. 7, 2017

(54) EXPANDING GATE VALVE ASSEMBLY (71) Applicant: Integrated Equipment, Inc., Houston, TX (US)

(72) Inventor: Sumeet Arora, Cypress, TX (US)

(73) Assignee: Integrated Equipment, Inc., Houston, TX (US)

( * ) Notice: Subject to any disclaimer, the term of this patent is extended or adjusted under 35 U.S.C. 154(b) by 0 days.

(21) Appl. No.: 14/348,493

(22) PCT Filed: Sep. 28, 2012

(86) PCT No.: PCT/US2012/058023
§ 371 (c)(1),
(2) Date: Mar. 28, 2014

(87) PCT Pub. No.: WO2013/049643
PCT Pub. Date: Apr. 4, 2013

(65) Prior Publication Data
US 2014/0252255 A1 Sep. 11, 2014

Related U.S. Application Data (60) Provisional application No. 61/542,028, filed on Sep. 30, 2011.

(51) Int. Cl.
*F16K 3/18* (2006.01)
*F16K 3/14* (2006.01)

(52) U.S. Cl.
CPC *F16K 3/14* (2013.01); *F16K 3/186* (2013.01)

(58) Field of Classification Search
CPC .............. F16K 3/14; F16K 3/186; F16K 3/10; F16K 3/18; F16K 3/184; F16K 3/12; F16K 3/16; F16K 3/314
(Continued)

(56) References Cited

U.S. PATENT DOCUMENTS 119,057 A * 9/1871 Snyder .................... F16K 3/186
251/195
589,008 A 8/1897 Martin
(Continued)

FOREIGN PATENT DOCUMENTS

CN 2047324 U 11/1989
CN 2806910 Y 8/2006
(Continued)

OTHER PUBLICATIONS

Machine Translation of DE896583 "Ebersold" originally published Nov. 1953.*
(Continued)

*Primary Examiner* — Mary McManmon
*Assistant Examiner* — David Colon Morales
(74) *Attorney, Agent, or Firm* — Conley Rose, P.C.

(57) ABSTRACT

An expanding gate valve assembly includes a segment and a gate Inner faces of the segment and gate are configured for slidable contact and angled faces of the segment and gate are configured for slidable contact to form a first gate assembly interface. The first gate assembly interface can further include a tab on the gate configured to contact a base surface of the segment to form a second gate assembly interface. A spring can be coupled between the gate and the segment to maintain at least the first gate assembly interface. The tab can be disposed below the segment to provide a lifting engagement with the base surface of the segment. The first gate assembly interface can be ledge-free.

9 Claims, 7 Drawing Sheets (58) Field of Classification Search
USPC ....... 251/167, 168, 193–197, 203, 204, 157, 251/158, 174, 176, 178, 198, 199, 200, 251/326, 327, 328, 329, 291
See application file for complete search history.

(56) References Cited

U.S. PATENT DOCUMENTS

| | | | |
|---|---|---|---|
| 623,194 A * | 4/1899 | Vollmann | F16K 3/0281 137/242 |
| 1,133,650 A | 3/1915 | Lentz | |
| 1,135,280 A | 4/1915 | Hamilton | |
| 1,280,451 A | 10/1918 | Hagen | |
| 1,803,889 A * | 5/1931 | Bohnhardt | F16K 3/186 251/176 |
| 1,990,762 A * | 2/1935 | Vetrano | F16K 3/186 251/176 |
| 2,002,647 A * | 5/1935 | Sorensen | F16K 3/186 251/195 |
| 2,002,780 A * | 5/1935 | Laurent | F16K 3/186 251/195 |
| 2,148,628 A * | 2/1939 | Laurent | F16K 3/186 137/246 |
| 2,150,254 A * | 3/1939 | Sorensen | F16K 3/186 251/176 |
| 2,210,189 A * | 8/1940 | Sorensen | F16K 3/186 251/167 |
| 2,224,939 A * | 12/1940 | Volpin | F16K 3/186 137/246 |
| 2,394,128 A * | 2/1946 | Wennerby | F16K 3/186 251/167 |
| 2,479,124 A * | 8/1949 | Laurent | F16K 3/186 251/167 |
| 2,482,409 A * | 9/1949 | Fowler | F16K 3/186 251/167 |
| 2,504,924 A * | 4/1950 | Fennema | F16K 3/186 251/167 |
| 2,541,968 A * | 2/1951 | Laurent | F16K 31/143 251/167 |
| 2,583,512 A | 1/1952 | Laurent | |
| 2,749,083 A * | 6/1956 | Fennema | F16K 3/186 251/167 |
| 2,778,600 A * | 1/1957 | Bredtschneider | F16K 3/186 251/196 |
| 2,834,571 A | 5/1958 | Hollander | |
| 2,843,152 A * | 7/1958 | Hubert | F16K 3/186 137/797 |
| 2,869,819 A | 1/1959 | Rucker | |
| 2,964,291 A | 12/1960 | Williams et al. | |
| 2,977,086 A | 3/1961 | Heinen | |
| 3,051,434 A * | 8/1962 | Gulick | F16K 3/186 251/167 |
| 3,068,901 A * | 12/1962 | Anderson | F16K 3/186 137/625.48 |
| 3,433,349 A | 3/1969 | Leach | |
| 3,554,486 A * | 1/1971 | Thebado | F16K 3/186 251/158 |
| 3,893,652 A * | 7/1975 | Natho | F16K 3/314 251/196 |
| 3,895,777 A | 7/1975 | Althaus | |
| 4,036,260 A | 7/1977 | Davis et al. | |
| 4,095,612 A * | 6/1978 | Hardcastle | F16K 3/0227 137/246.22 |
| 4,149,558 A | 4/1979 | McGee et al. | |
| 4,179,099 A | 12/1979 | Pierce | |
| 4,189,127 A | 2/1980 | Constantino | |
| 4,289,157 A | 9/1981 | McGee | |
| 4,291,862 A * | 9/1981 | Alvarez | F16K 31/52475 251/167 |
| 4,373,700 A | 2/1983 | Buchta | |
| 4,376,524 A * | 3/1983 | Shelton | F16K 3/30 251/196 |
| 4,383,546 A | 5/1983 | Walters, Jr. | |
| 4,468,039 A | 8/1984 | Le et al. | |
| 4,487,393 A | 12/1984 | Eagen | |
| 4,510,960 A | 4/1985 | Jennings et al. | |
| 4,534,540 A | 8/1985 | Bragin et al. | |
| 4,548,386 A | 10/1985 | Gladisch et al. | |
| 4,573,660 A | 3/1986 | Husted | |
| 4,682,757 A | 7/1987 | Shelton | |
| 4,913,400 A | 4/1990 | Tiefenthaler | |
| 5,037,064 A | 8/1991 | Pond | |
| 5,094,270 A | 3/1992 | Reimert | |
| 5,127,629 A | 7/1992 | Holliday | |
| 5,205,535 A | 4/1993 | Nevrekar | |
| 5,221,063 A | 6/1993 | Wafer et al. | |
| 5,232,199 A | 8/1993 | Thrasher | |
| 5,312,087 A | 5/1994 | Jones | |
| 5,435,520 A | 7/1995 | Vyvial | |
| 5,662,308 A | 9/1997 | Nevrekar | |
| 5,743,288 A | 4/1998 | Mosman et al. | |
| 5,908,046 A | 6/1999 | Mosman | |
| 6,158,718 A | 12/2000 | Lang et al. | |
| 6,164,622 A | 12/2000 | Partridge | |
| 7,309,058 B2 | 12/2007 | Hunter et al. | |
| 7,931,251 B2 | 4/2011 | Partridge | |
| 7,992,840 B2 | 8/2011 | Cain et al. | |
| 2003/0038265 A1 | 2/2003 | Koerner | |
| 2005/0012063 A1 | 1/2005 | Thompson et al. | |
| 2005/0230653 A1 | 10/2005 | Thompson et al. | |
| 2010/0171056 A1 | 7/2010 | Hoang | |

FOREIGN PATENT DOCUMENTS

| | | | | |
|---|---|---|---|---|
| CN | 200958620 Y | 10/2007 | | |
| CN | 201462019 U | 5/2010 | | |
| CN | 201496587 U | 6/2010 | | |
| CN | 101949456 A | 1/2011 | | |
| DE | 896583 C | * 11/1953 | | F16K 3/186 |
| FR | 1222680 A | * 6/1960 | | F16K 3/186 |

OTHER PUBLICATIONS

Machine Translation of FR1222680 "Julien" originally published Jul. 1960.*
Machine translation of Gong (CN2806910, Pub. Aug. 16, 2006, reference was provided by the applicant in IDS).*
Canadian Office Action dated Jul. 10, 2015, for Canadian Application No. 2,850,506 (10 p.).
English Summary of Colombian Office Action dated Jul. 17, 2015, for Colombian Application No. 14088011 (11 p.).
Chinese Office Action dated Apr. 1, 2015 for Chinese Application No. 201280051522.3 (10 p.).
English Translation of Chinese Office Action dated Apr. 1, 2015 for Chinese Application No. 201280051522.3 (12 p.).
PCT/US2012/058023 International Search Report and Written Opinion dated Dec. 27, 2012 (8 p.).
Brochure: "API 6A Gate Valves," (2010) Array Products, Inc., d.b.A. Array Products, Houston, Texas (24 p.).
Brochure: "Split Through Conduit Gate Valves (Expanding Gate)" (6 p.).
Brochure: "Thru Conduit Slab and Expanding Gate Valves," Southern California Valve, Santa Fe, Texas (20 p.).
Brochure: "Surface Drilling and Completion Systems," (2008) VetcoGray, Inc., Houston, Texas (21 p.).
Brochure: "Gate Valves: Model 2200E Expanding Gate Valve," Wood Group Pressure Control, Houston, Texas (1 p.).
Singapore Written Opinion dated Mar. 9, 2015; Singapore Application No. 11201401107Q (13 p.).
Canadian Office Action dated Apr. 6, 2016, for Canadian Application No. 2,850,506 (7 p.).
English Summary of Colombian Office Action dated Nov. 25, 2015, for Colombian Application No. 14088011 (6 p.).
Chinese Office Action dated Nov. 18, 2015, for Chinese Application No. 201280051522.3 (10 p.).
English Translation of Chinese Office Action dated Nov. 18, 2015, for Chinese Application No. 201280051522.3 (13 p.).
Eurasian Office Action dated Jun. 15, 2016, for Eurasian Application No. 201490589 (3 p.).

(56) References Cited

OTHER PUBLICATIONS

English Translation of Eurasian Office Action dated Jun. 15, 2016, for Eurasian Application No. 201490589 (3 p.).

* cited by examiner

EXPANDING GATE VALVE ASSEMBLY

CROSS-REFERENCE TO RELATED APPLICATION

This application is a 35 U.S.C. §371 national stage application of PCT/US2012/058023 filed Sep. 28, 2012 and entitled "Expanding Gate Valve Assembly," which claims priority to U.S. Provisional Application Ser. No. 61/542,028 filed Sep. 30, 2011, entitled "Gate Valve With Back Seat," both of which are hereby incorporated herein by reference in their entirety for all purposes.

BACKGROUND

Hydrocarbon production and refining includes many high temperature and high pressure pipeline fluids that are conveyed in assorted conduits. The direction and flow of these fluids is at least partially controlled by valves and valve assemblies. These assemblies require periodic maintenance or replacement of certain components during operation of a conduit. Maintenance and replacement inherently includes a risk of personnel exposure to pipeline fluids. Valves having a stem, such as slab valves and expanding valves, may leak, spray, or otherwise expose service personnel to the pipeline fluids. Additionally, material suspended in pipeline fluids or the fluids themselves may interfere with the operation of a valve and the maintenance thereof.

BRIEF SUMMARY

A valve includes a segment and a gate, the gate having a slidable coupler to engage a stem, a back seat, and a segment lifting tab on the gate component. In some embodiments, the valve is an assembly including a segment having an inner face, an angled face, and a base surface, a gate having an inner face, an angled face, and a tab, wherein the inner faces are configured for slidable contact and the angled faces are configured for slidable contact to form a first gate assembly interface, wherein the tab is configured to contact the base surface to form a second gate assembly interface including the first gate assembly interface, and a spring coupled between the gate and the segment configured to maintain at least the first gate assembly interface. The base surface may include a stepped surface. The gate tab may be in complementary lifting engagement with the stepped surface of the segment. Contact between the tab and the base surface may be below the first gate assembly interface such that the second gate assembly interface is a slidable contact and lifting interface between the segment and the gate. The first gate assembly interface may be ledge-free. The base surface may include a foot. An extension of the foot may be adjustable.

An expanding gate valve includes a valve body configured for bi-directional flow, having a chamber therein, a bonnet coupled to the valve body, forming an upper portion of the chamber, a stem extending through the bonnet into the chamber, and a gate assembly disposed in the chamber, the gate assembly including a segment having an inner face, an angled face, and a foot, a gate having an inner face, an angled face, a tab and a groove, wherein the groove extends across the thickness of the gate, and a receiver positioned in the groove and configured for converting rotational movement into linear movement.

In some embodiments, an expanding gate valve assembly includes a segment and a gate disposed in a valve body, wherein the gate includes an outer face and an inner face having a fluid bore therethrough, an angled face extending from the inner face, a receptor, and a tab extending from the inner face opposite the angled face. The receptor may be disposed opposite the tab on the gate and comprise a cavity and a groove extending through the gate. The assembly may further include a receiver slidably engaged within the groove of the receptor. The receiver may be configured to couple to a stem extending into the cavity. The stem may include a shoulder, such as a tapered or conical shoulder, for contacting the valve body, and can be referred to as a back seat. The tab may extend perpendicularly from the inner face.

In some embodiments, as expanding gate valve assembly includes a segment and a gate disposed in a valve body, wherein the segment includes an outer face and an inner face having a fluid bore therethrough, an angled face extending from the inner face to the outer face at a first end, a base surface extending from the inner face to the outer face at a second end, and a foot disposed on the base surface. The base surface may include a stepped surface. The foot may be extendable from the base surface.

In some embodiments, an expanding gate valve assembly includes a segment having an angled face, a gate having a groove and an angled face, a stem extending through the gate, a receiver disposed in the groove and engaging the stem, the receiver configured for converting rotational movement into linear movement, wherein the gate angled face slidably contacts the segment angled face for bi-directional translation. The receiver may be configured to move relative to the gate in at least two axes. The receiver may be configured to slidably traverse the width of the gate in the groove. The resilient member may extend between the segment and the gate to maintain slidable contact between the segment angled face and the gate angled face.

In some embodiments, an expanding gate valve assembly includes a segment having an inner face, an angled face, and a base surface disposed distal from the angled face, a gate having an inner face and an angled face in slidable contact with the segment angled face, and a spring to retain the gate and segment in slidable contact along the respective angled faces, wherein a tab extends from the inner face of the gate distal from the angled face, and the tab contacts the base surface of the segment.

In some embodiments, an expanding gate valve assembly includes a segment having an angled face, a gate having an angled face and a groove, wherein the angled face slidably contacts the segment angled face for bi-directional translation, and wherein the groove extends across the thickness of the gate, and a receiver positioned in the groove and coupled to the stem for converting rotational movement of the stem into the bi-directional linear translation, wherein the receiver is configured to traverse the groove in the gate.

The foregoing has outlined rather broadly the features and technical advantages of the disclosure in order that the detailed description that follows may be better understood. Additional features and advantages of the disclosure will be described hereinafter that form the subject of the claims of the disclosure. It should be appreciated by those skilled in the art that the conception and the specific embodiments disclosed may be readily utilized as a basis for modifying or designing other structures for carrying out the same purposes of the disclosure. It should also be realized by those skilled in the art that such equivalent constructions do not depart from the spirit and scope of the disclosure as set forth in the appended claims.

BRIEF DESCRIPTION OF THE DRAWINGS

For a detailed description of the preferred embodiments of the disclosure, reference will now be made to the accompanying drawings in which.

NOTATION AND NOMENCLATURE

In the drawings and description that follow, like parts are identified throughout the specification and drawings with the same reference numerals. The drawings are not necessarily to scale. Certain features of the disclosure may be shown exaggerated in scale or in somewhat schematic form and some details of conventional elements may not be shown in the interest of clarity and conciseness. The disclosure is subject to embodiments of different forms. Some specific embodiments are described in detail and are shown in the drawings with the understanding that the disclosure is to be considered an exemplification of the principles of the invention and is not intended to limit the disclosure to the illustrated and described embodiments. The different teachings of the embodiments discussed below may be employed separately or in any suitable combination to produce desired results.

Certain terms are used throughout the following descriptions and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ". The terms "connect," "engage," "couple," "attach," or any other term describing an interaction between elements is not meant to limit the interaction to direct interaction between the elements and may also include indirect interaction between the elements described wherein other devices, apparatuses, and connections may intervene. Also, the terms "chamber" or "cavity" are intended to mean a portion along a fluid conduit having an increased cross-section in any direction for any distance along the conduit. The various characteristics mentioned above, as well as other features and characteristics described in more detail below, will be readily apparent to those skilled in the art upon reading the following detailed description of the embodiments, and by referring to the accompanying drawings.

DETAILED DESCRIPTION

Figure 1:
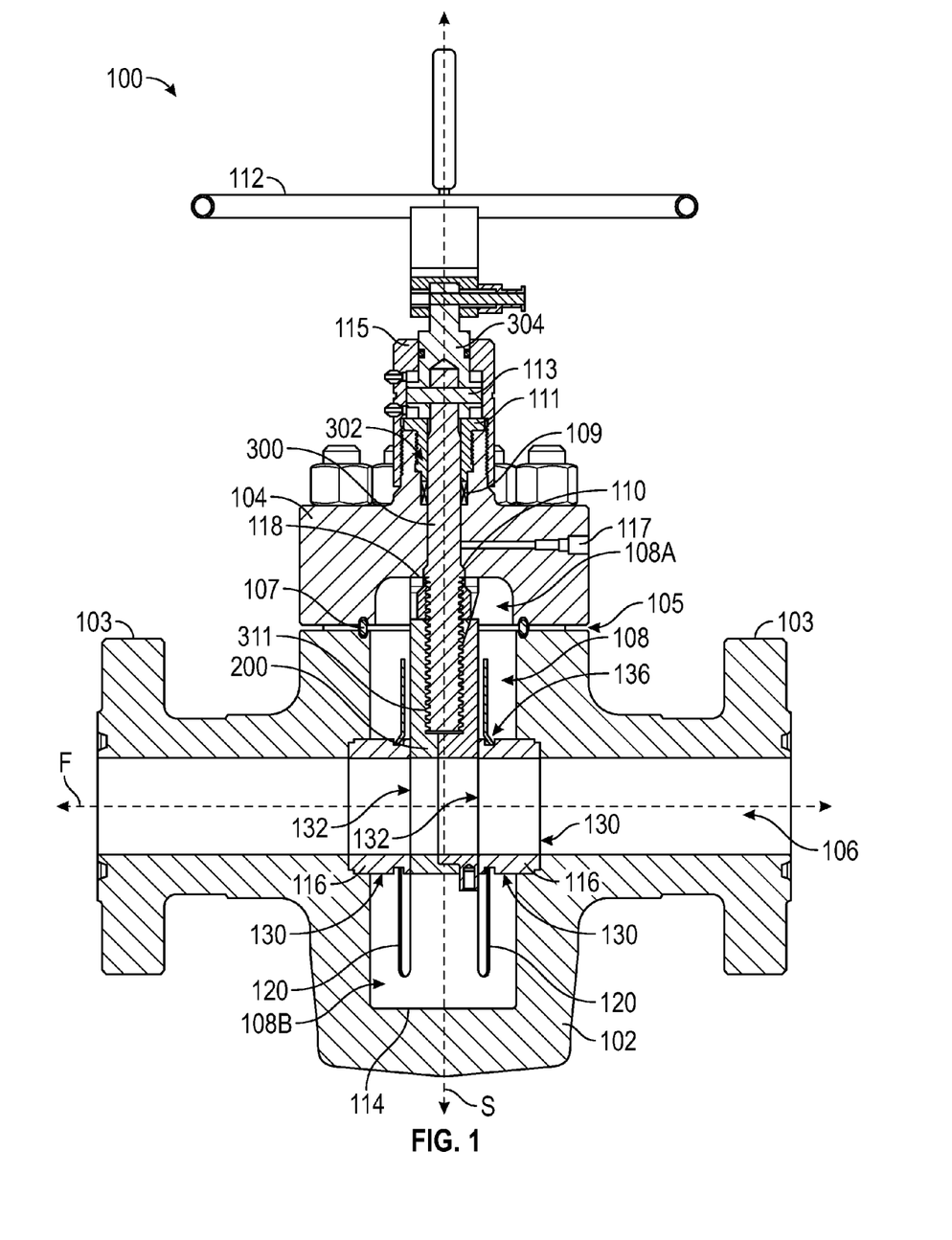
FIG. 1 illustrates a cross-section of the assembly of an expanding gate valve with a back seat, wherein the expanding gate is in the open position.

FIG. 1 illustrates a valve 100 including a gate assembly 200 and back seat 110. The valve 100 includes a body 102 and a bonnet 104 mechanically coupled together at a bonnet interface 105. The body 102 has a flow bore 106 having a flow bore axis F, forming a bi-directional flow path therethrough. The flow bore 106 includes a cavity or chamber 108. The gate assembly 200 is disposed in the chamber 108.

The gate assembly 200 is coupled to a stem 300 for operation, such as for opening or closing the valve 100. The stem 300 and a stem axis S are substantially perpendicular to the flow bore 106 and corresponding flow bore axis F. The stem 300 extends from the chamber 108, through the bonnet 104 to control mechanisms 112. The stem 300 is configured to move gate assembly 200 in the chamber 108 along stem axis S and substantially normal to the flow bore axis F. Further, the stem 300 includes a shoulder 310 that contacts bonnet 104 at back seat 110 in certain configurations.

The body 102 is a valve body extending between flanges 103 that couple to a pipeline or other fluid conduit to put the valve 100 in fluid communication with the pipeline or other fluid conduit. The chamber 108 is positioned in the flow bore 106 of the body 102 between the flanges 103. The flow bore axis F extends between the flanges 103 in the center of the flow bore 106. The chamber 108 is oriented substantially perpendicular to the flow bore 106 in the direction extending from the bonnet interface 105 to a chamber wall 114. The chamber 108 is positioned approximately at the middle of the body 102 and bisects the flow bore 106 between the flanges 103. Further, the flow bore 106 bisects the chamber 108 into an upper chamber 108A proximal to the bonnet interface 105 and a lower chamber 108B proximal to the chamber wall 114. Valve seats 116 are disposed at least partially in the flow bore 106 and extend at least partially into the chamber 108.

The bonnet 104 is coupled to body 102 at the bonnet interface 105 and seals the upper chamber 108A. The bonnet 104 includes a bonnet gasket 107, a valve assembly stop 118, the stem or back seat 110, a stem passage 302, a packing 109, a packing gland 111, a stem adapter 304, a stem bearing 113, a cap 115, and in certain instances a fitting 117. Packing 109 and packing gland 111 are configured to prevent leaks from chamber 108. Packing gland 111 is configured to retain packing 109 in bonnet 104 and in contact with stem 300. Packing gland 111 seals packing 109 against the stem 300. Cap 115 may at least partially provide reinforcement to packing gland 111. The control mechanisms 112 are disposed external to the chamber 108, proximal to the bonnet 104, and coupled to the stem 300. Controls 112 may be any actuator or rotatable member, such as a hand wheel. In certain instances, bonnet 104 includes a fitting 117 to inject lubricants into a stem passage 302 or alternatively to check pressure within stem passage 302 and packing 109. Further, bonnet 104 may be coupled to body 102 in any configuration or orientation, for example, such that the fitting 117 is oriented at any angle relative to the body 102 and the flow bore 106 therethrough.

Figure 2:
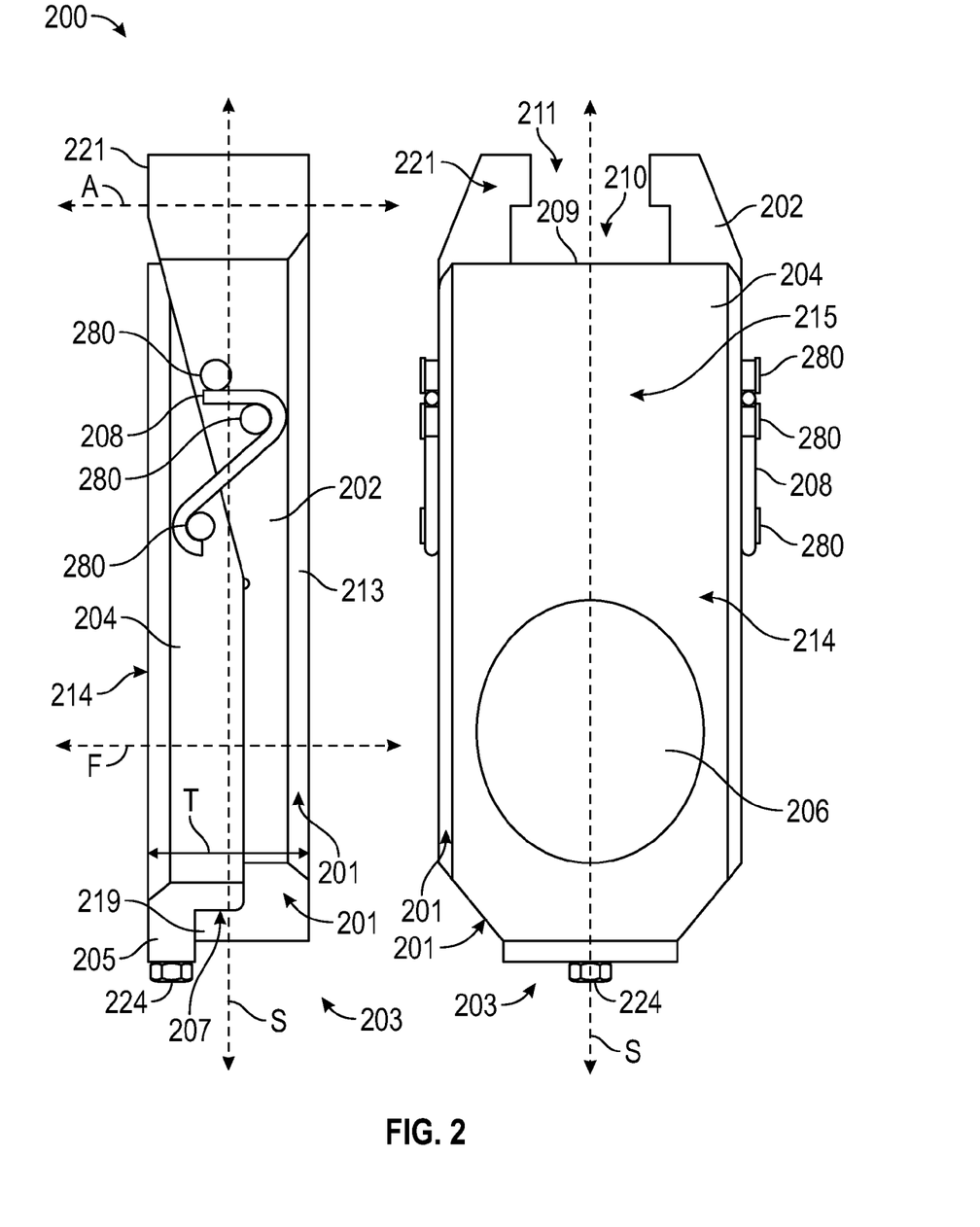
FIG. 2 illustrates a lateral and front elevation view of an expanding gate assembly.
Figure 3:
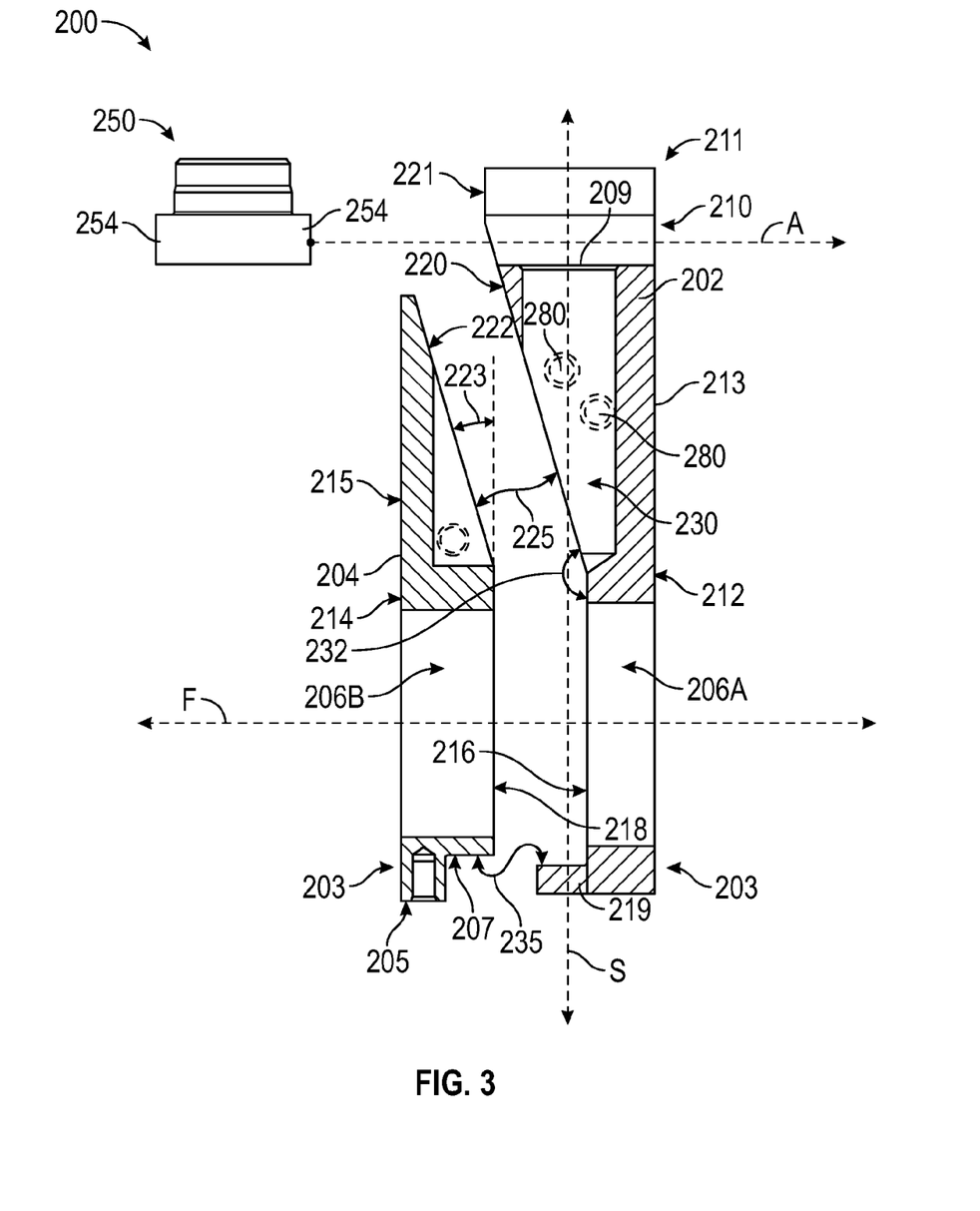
FIG. 3 illustrates a lateral cross-section of the expanding gate assembly according to FIG. 2.

Referring now to FIGS. 2 and 3, gate assembly 200 may also be referred to as an expanding gate assembly. Gate assembly 200 includes a gate 202 and a segment 204 in slidable and mating contact. Gate 202 and segment 204 are retained in contact and mating engagement by a spring 208 across at least a portion of a thickness T which may also be referred to as a depth of the gate assembly 200. Stem 300 couples to the gate assembly 200 at a receptor 210 in gate 202. Gate assembly 200 includes a fluid bore 206 therethrough. Gate 202 includes fluid bore 206A and segment 204 includes a fluid bore 206B. Fluid bore 206 through the gate assembly 200 is configured to be contiguous with flow bore 106 through the body 102 when the gate assembly 200 is in the operational or open position such that fluid may flow therethrough. Fluid bore 106 through body 102 and fluid bore 206 through gate assembly 200 are coaxial along the flow bore axis F in the fully open or operational position of the valve 100.

The segment 204 includes an outer face 214, an inner face 218, an angled face 222, and a foot 224. The outer face 214 is oriented substantially parallel with a valve seat 116, and substantially perpendicular to the flow bore 106. The outer face 214 has a sealing surface 215 adjacent to the flow bore 106 for interfacing with a valve seat 116 and blocking fluid flow. Further, the outer face 214 annular to the flow bore 106 is configured for sealably interfacing with a valve seat 116. Segment 204 may include beveled edges 201 to relieve or prevent stress risers or ease operation.

The inner face 218 is proximal to a base 203 of the gate assembly 200, oriented substantially parallel to the outer face 214, and substantially perpendicular to the fluid bore 206B. The inner face 218 is annular to the fluid bore 206 and fluid bore 206B forms a fluid conduit from the outer face 214 to the inner face 218 through segment 204. Inner face 218 contacts gate 202 in certain configurations and operations of the gate assembly 200.

Angled face 222 is adjacent to the inner face 218 and distal from the base 203. Angled face 222 does not include a portion of fluid bore 206B. Angled face 222 is disposed at an angle 223 with respect to inner face 218, creating a corner, such as found at the intersection of two planar faces. In certain instances the angle 223 may be considered acute, or between about 0 degrees and about 90 degrees relative to inner face 218. Further, in some configurations, the angle 223 may be between about 0 degrees and about 45 degrees relative to the inner face 218. Alternatively, angle 223 may be between about 10 degrees and about 20 degrees relative to the inner face 218. In certain configurations, the angle 223 is 18 degrees. Additionally, in some embodiments, the intersection at angle 223 between the angled face 222 and the inner face 218 consists of only the corner, and does not include a ledge, a shoulder, or any other "catch" or interference feature that resists movement between the segment 204 and the gate 202. Thus, in some embodiments, the interface between the segment 204 and the gate 202 at the corner or transition between the faces 218, 222 can be referred to as ledge-free or interference-free.

Segment 204 includes a base surface 205 and a foot 224. Base surface 205 is adjacent to the inner face 218. Base surface 205 forms the distal terminus of the valve assembly from the stem 300 and associated receptor 210. Base surface 205 is notched to form a stepped surface 207. Stepped surface 207 may be a square or rectangular notch relieved into base surface 205 and into inner face 218. In certain configurations and operations of the gate assembly 200, the stepped surface 207 contacts gate 202.

Foot 224 is a repositionable stop or stopper for segment 204 and extends substantially perpendicularly from base surface 205. Foot 224 is coupled to and extendable from base surface 205 of segment 204 via a threaded coupling. In certain configurations and operations of the valve assembly, the foot 224 is configured for linear extension and linear adjustment of the distance and extension from the base surface 205 by the threaded coupling to segment 204. In certain instances foot 224 may be deformable, shearable, or crushable to prevent damage to the segment 204 or the gate assembly 200.

The gate 202 includes an outer face 212, an inner face 216, an angled face 220, a stem cavity 230, the receptor 210, and the fluid bore 206A. The gate 202 is generally complementary to the segment 204 for mating contact or engagement. In configurations and operations of the valve assembly, the inner face 216 and the angled face 220 of the gate 202 contact the respective inner face 218 and angled face 222 of the segment 204 to form a first gate assembly interface 225. Gate 202 is configured to contact the stop 118 on the bonnet during withdrawal of gate assembly 200 from flow bore 106 (or, opening of the valve 100) at shoulders 217. Further, gate 202 includes lifting tab 219 disposed proximal to the base 203, distal from the stem 300 and receptor 210, and opposite the angled face 220.

The outer face 212 is oriented substantially parallel with a valve seat 116, and substantially perpendicular to the flow bore 106 and flow bore axis F. The outer face 212 extends from the receptor 210 to the base 203. The outer face 212 has a sealing surface 213 adjacent to the flow bore 106 for sealably interfacing with a valve seat 116. Further, the outer face 212 annular to the flow bore 106 is configured for sealably interfacing with a valve seat 116 to permit fluid flow through the flow bore 206B. Gate 202 may include beveled edges 201 to ease operation and relieve stress. The inner face 216 is proximal to the base 203, oriented substantially parallel to the outer face 212, and substantially perpendicular to the fluid bore 206A. Additionally, the inner face 216 is annular to the fluid bore 206A. As such, fluid bore 206A extends from the outer face 212 to the inner face 216 through gate 202. The inner face 216 contacts the segment inner face 218 in certain configurations and operations.

An opposite face 221 is proximal to the receptor 210 and the stem 300. Opposite face 221 may be disposed across thickness T of the gate assembly 200 from the outer face 212. In alternative configurations opposite face 221 is an angled, beveled, or relieved surface proximal or adjacent to receptor 210 to prevent stress and ease operation of the gate assembly 200.

Angled face 220 extends from the inner face 216 to the opposite face 221. Angled face 220 is disposed at an angle 232 with respect to inner face 216, creating a corner such as found at the intersection of two planar faces. Angle 232 is complementary to angle 223, such that the sum of the angle 232 and angle 223 is 180 degrees. In certain instances the angle 232 may be considered obtuse, or between about 90 degrees and about 180 degrees relative to the inner face 216. Further, in some configurations, the angle 232 may be between about 135 degrees and about 180 degrees relative to the inner face 216. Alternatively, angle 232 may be between about 160 and about 170 degrees relative to the inner face 216. In certain configurations, the angle 232 is 162 degrees. Additionally, in some embodiments, the intersection at angle 232 between the angled face 220 and the inner face 216 consists of only the corner, and does not include a ledge, a shoulder, or any other "catch" or interference feature that resists movement between the segment 204 and the gate 202. Thus, in some embodiments, the interface between the segment 204 and the gate 202 at the corner or transition between the faces 216, 220 can be referred to as ledge-free or interference-free.

Lifting tab 219 is disposed proximal to base 203 extending substantially perpendicularly from the inner face 216, and opposite the angled face 222. Lifting tab 219 is configured for interlocking or complementary fitment with the base surface 205 of the segment 204. More specifically, lifting tab 219 is configured for interlocking or complementary fitment with the stepped surface 207 of the segment base surface 205. Further, lifting tab 219 may also be configured to contact wall 114 in the body 102. In some embodiments, the lifting tab 219 contacts the base surface 205 and the stepped surface 207 to provide an interfacing between the gate 202 and the segment 204 in addition to the first gate assembly interface 225, thus forming a second gate assembly interface 235 that includes the first gate assembly interface 225.

Referring now to FIGS. 1 through 3, the gate 202 includes a receptor 210 for the stem 300. Receptor 210 includes a cavity 230, a groove 211, a receiver 250, and shoulders 217. Cavity 230 extends into the body of gate 202 between outer face 212 and opposite face 221. Cavity 230 is configured to receive the stem 300; particularly a distal or threaded end 311 of the stem 300 from the controls 112. Groove 211 extends laterally across thickness T distal to the base 203 of the gate. Groove 211 is positioned below and partially formed by shoulders 217.

Receiver 250 engages the stem 300, for example by threads 252, to movably couple gate assembly 200 and stem 300. Receiver 250 is configured to slidably interface with groove 211 in gate 202, in contact with the groove floor 209 and shoulders 217. Receiver 250 includes at least one tab 254 that interfaces with shoulders 217 and retains receiver 250 in groove 211. Receiver 250 is free to slidably traverse a portion of groove 211 along axis A. Receiver 250 is at least partially constrained from motion in axes other than axis A.

In non-limiting exemplary configurations, the receiver 250 is configured as a "T-nut." Further, in alternative exemplary configurations, the receiver may be configured as an elongate solid, such as a cylinder or rectangular polyhedron. In these instances, the threads 252 of the receiver 250 are oriented substantially along the stem axis S, while the longitudinal axis of the receiver is substantially perpendicular thereto.

Figure 5:
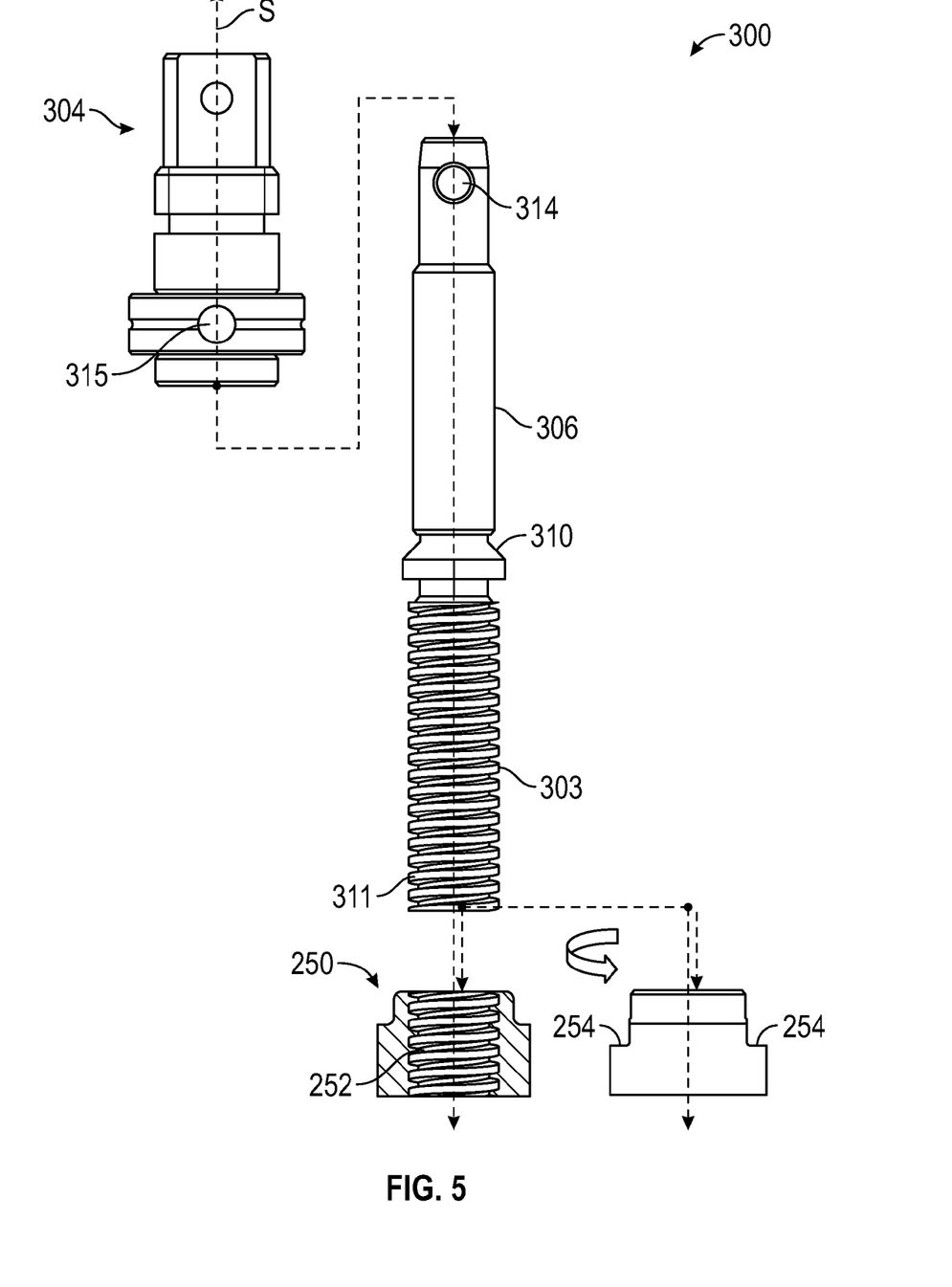
FIG. 5 illustrates a stem adapter, stem, and receiver configuration for an expanding gate assembly.

Referring now to FIG. 5, the stem 300 includes threads 303 at threaded end 311, shoulder 310, shaft 306, and adapter 304. Generally, the stem 300 is configured for converting rotational movement into linear movement via interface with the receiver 250. Threads 303 are positioned on threaded end 311, distal from the controls 112 and disposed within the chamber 108. Threads 303 are configured to engage the receiver threads 252, such that rotation of the stem 300 results in the linear translation of receiver 250 and gate assembly 200 coupled thereto. Further, threads 303 may be configured as right-handed or left-handed threads to complementarily engage threads 252 of the receiver 252. In certain instances, the threads are left-handed, such that receiver 250 traverses the threads 303 away from the controls 112 when the controls 112 and shaft 306 are rotated clockwise by an operator.

Figure 6:
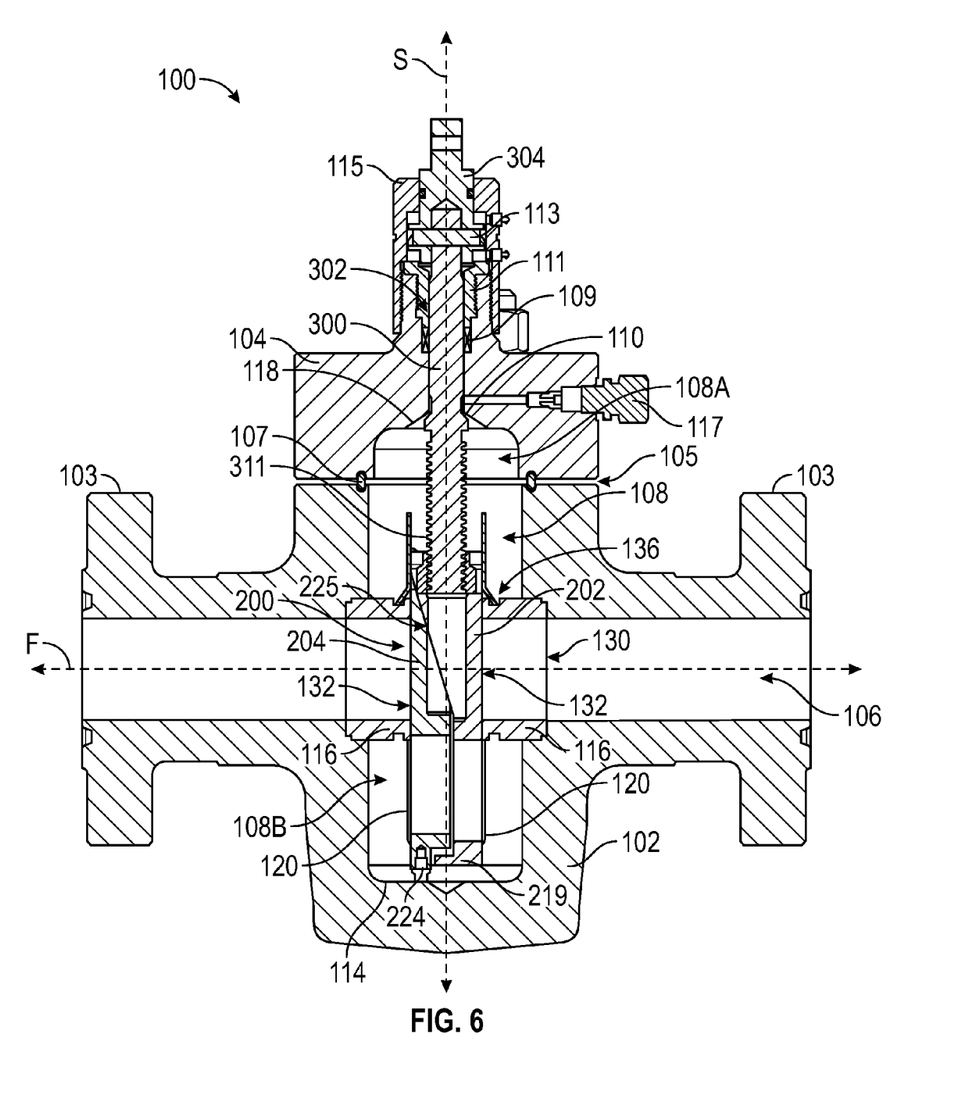
FIG. 6 illustrates a cross-section of the assembly of an expanding gate valve with a back seat, wherein the expanding gate is in the closed position.

The stem 300 includes shoulder 310 having at least two surfaces radially extended from the shaft 304. Shoulder 310 has a conical, frustroconical, hemispherical, or frustohemispherical surface disposed about the shaft 306 at an angle relative thereto, having a complementary fit to the back seat 110 of the bonnet 104. Shaft 306 extends through the bonnet 104 via the stem passage 302. In certain instances, shaft 306 is coupled to adapter 304 as shown in FIG. 5. Adapter 304 and shaft 306 may be coupled, for example, by a shear pin or drive pin inserted through adapter passage 315 and stem passage 314. Adapter 304 is configured to interface with the controls 112 and may be retained in the bonnet 104 by a stem bearing 113 and cap 115, as illustrated in FIGS. 1 and 6.

Figure 4:
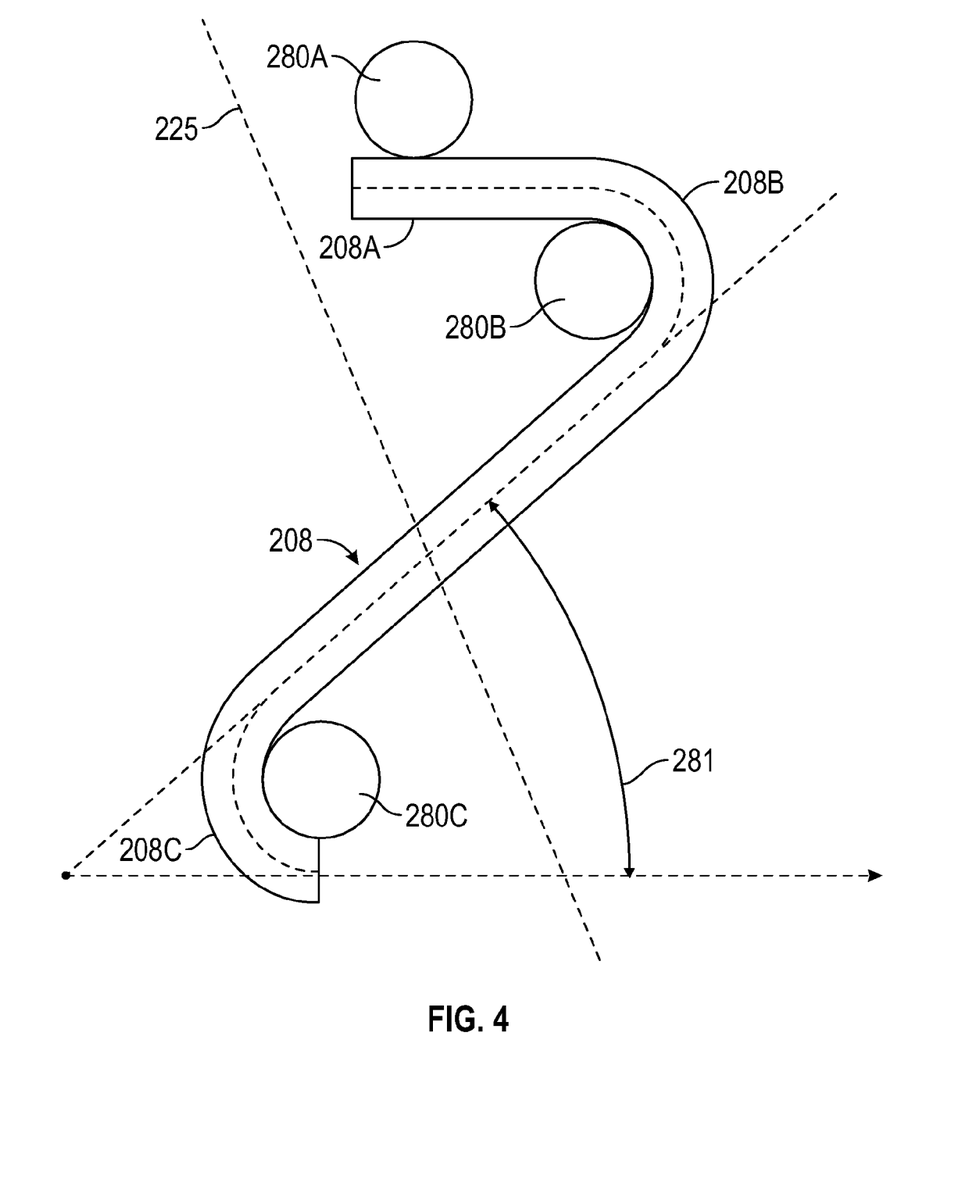
FIG. 4 illustrates a spring configuration for an expanding gate assembly.

Referring now to FIG. 4, gate 202 and segment 204 of the assembly are held in contact by at least one spring 208 or other resilient member. Spring 208 is in contact with a plurality of posts 280 disposed on the gate 202 and segment 204. Posts 280 may be press fit components of gate 202 and segment 204. Spring 208 is configured to retract and retain segment 204 and gate 202 in slidable contact, for example across first gate assembly interface 225. Further, spring 208 is configured to provide tension on the stem 300 via gate assembly 200.

In certain instances, spring 208 is configured as a tension spring, a torsion spring, or a Z-spring. Spring 208 is configured to compress and expand angularly around at least one post 280. In certain instances, the spring is configured to compress and expand at an angle 281 from about 5 degrees to about 50 degrees; alternatively from about 5 degrees to about 45 degrees; and in certain instances from about 7 degrees to about 43 degrees. In certain instances, spring 208 interfaces with 3 posts, such that at least one post 280A is associated with a linear portion 208A. Further, spring 280 is configured to have two bends, bend 208B and bend 208C, for interfacing with post 280B and post 280C, respectively. The bends 208B, 208C generally define a "Z" shape of spring 208.

Referring again to FIG. 1 and FIG. 6, valve seats 116 are disposed at least partially in the flow bore 106 and extend at least partially into the chamber 108. Valve seats 116 are positioned in valve pockets 130 annular to flow bore 106. Valve seats 116 include generally parallel outer faces 132 disposed in the chamber 108. Valve seats 116 include at least one seal 134 disposed annularly to the flow bore 106 and between the valve seat 116 and the valve pocket 130. Valve seats 116 may include a plurality of seals 134 in certain configurations and operations.

Valve seats 116 may at least partially support gate guides 120. Gate guides 120 are positioned in the chamber 108 and include a passage 302 coaxial with the flow bore 106 therethrough. Gate guides 120 may contact chamber wall 114 or be entirely supported by the valve seats 116. Further, gate guides 120 may include scrapers 136 that flexibly interface with valve seats 116 for sealing, and positioning the valve seats 116 within the chamber.

Referring now to FIGS. 1, 2, and 3, in operation the flow bore 106 and fluid bore 206 are contiguous in order to permit the flow of fluids along the pipeline. Under certain conditions, such as fire, or other operations such as downstream maintenance, valve 100 may be operated to interrupt the fluid flow therethrough. The valve 100 is configured such that the controls 112 are operated until the valve is closed and the fluid flow is terminated.

The controls 112 is operated either by personnel or mechanical actuators in order to rotate stem 300 such that the receiver 250 pushes the gate assembly 200 into the flow bore 106, toward the wall 114. When the outside faces 212, 214 of the segment 204 and gate 202 are approximately aligned with the flow bore axis F, the foot 224 extending from the segment 204 contacts the wall 114 of the chamber 108. The foot 224 prevents further movement of the segment 204 towards wall 114. Continued application of torque to controls 112 forces the angled face 220 of the gate 202 into slidable contact with the angled face 222 of segment 204. As the gate 202 is not constrained by the foot 224, it continues linear movement, translation, or translocation substantially along the stem axis S, toward wall 114. The angled faces 220, 222 provide a wedging force substantially perpendicular to the stem axis S and along the flow bore axis F. As such, the translation or translocation of the gate is bi-directional, that is it continues to move along linearly due to the motion of stem 300, but the angled faces 220, 222 respectively allow the gate 202 to move laterally along flow bore axis F. The segment 204 has ceased linear motion, but due to the wedging action of the angled faces 220, 222 respectively, foot 224 slides across wall 114, such that segment 204 moves laterally along flow bore axis F in the opposite direction as gate 202 within chamber 108. The outer surface 212 of the gate 202 and the outer surface 214 of the segment 204 sealably contact the valve seats 116 to prevent fluid flow therethrough. Further, continued application of torque to controls 112 may at least partially compress the plurality of seals 134 in each seat pocket 130 and provide additional resistance to high pressure fluid penetration into the chamber 108.

During the closing operation described hereinabove, the continued application of torque to the stem 300 and receiver 250 may place these components under a lateral strain as the gate 202 moves laterally with respect to the stem axis S. The lateral strain may act against the seal in a closed valve, prematurely wearing components of the valve 100 (such as the packing 109), or result in other operational irregularities. As such, the configuration of the receiver 250 and the gate 202 in the present disclosure, allows for the receiver 250 to laterally traverse the thickness T of the gate 202 and gate assembly 200 to maintain a co-axial position with respect to the stem axis S as the gate 202 moves perpendicular thereto, towards a valve seat 116. The slidable movement or translocation of receiver 250 relieves or prevents lateral strain applied to the stem 300 and components of the bonnet 104.

Referring now to FIGS. 1, 2, and 3, in order to restore operation the flow bore 106 must be restored to co-axial with the fluid bore 206 to form a contiguous conduit to permit the flow of fluids. Further, under certain conditions, such as valve maintenance, valve 100 may be opened completely to permit the fluid flow therethrough, as well as to relieve pressure, and prevent exposure of personnel to the fluids. The valve 100 is configured such that the controls 112 are operated until the fluid flow is restored and the valve is opened.

The controls 112 are operated either by personnel or mechanical actuators in order to rotate stem 300 such that the receiver 250 pulls the gate assembly 200 from the flow bore 106, toward the bonnet 104. Removing the closing torque and applying opening torque, reverses the direction the receiver 250 moves along the stem 300, and retracts the gate assembly 200 toward the bonnet 104. The receiver 250 contacts the gate shoulders 117, such that the torque transmitted by the stem 300 is transferred to the gate 202. As the gate 202 is pulled toward the bonnet 104, the springs 208 apply pressure to the gate 202 and segment 204 away from the valve seat 116. Further, the pressure or force from the springs 208 is sufficient to allow the gate angled face 220 to slidably traverse the segment angled face 222 until the inner faces 216, 218 come in contact. Further, application of torque to the controls 112 continues the linear movement of the fluid bore 206 into alignment with the flow bore 106. Once the fluid bore 206 of the gate assembly is sufficiently co-axial with flow bore axis F, the shoulder 310 contacts the valve assembly stop 118 in the bonnet 104.

In certain instances, due to thermal differential, pressure differential, or chemical adhesion, the valve seats 116 and gate assembly 200 remain at least partially conjoined (or, stuck together). The lifting tab 219 contacts the base surface 205 and provides additional support and mechanical motivation for the segment 204 during refraction. Additionally, gate guides 120 comprising scrapers 132 retain the valve seats 116 in the seat pockets 130 while the gate assembly 200 is being refracted.

In still further instances, when the valve assembly 200 contacts the stop 118 such that the fluid bore 206 may not interfere with or reenter the flow bore 106. The cap 115 of the bonnet 104 may be at least partially loosened or relieved of torque such that the stem 300 may be at least partially loosened or de-torqued from the gate assembly 200. The stem 300 may be partially withdrawn such that the shoulder 310 contacts the back seat 110. Alternatively, it may be possible to de-torque the stem 300 from the receiver 250 such that the shoulder 310 may be withdrawn to the back seat 110, without de-torquing or loosening any other components coupled to bonnet 104. The shoulder 310 and back seat 110 interface to seal and prevent the fluids in the flow bore 106 from leaking or escaping the upper chamber 108A, via the stem passage 302, through the packing 109, the cap 115, and exposing controls 112 or a person to the fluids.

Figure 7:
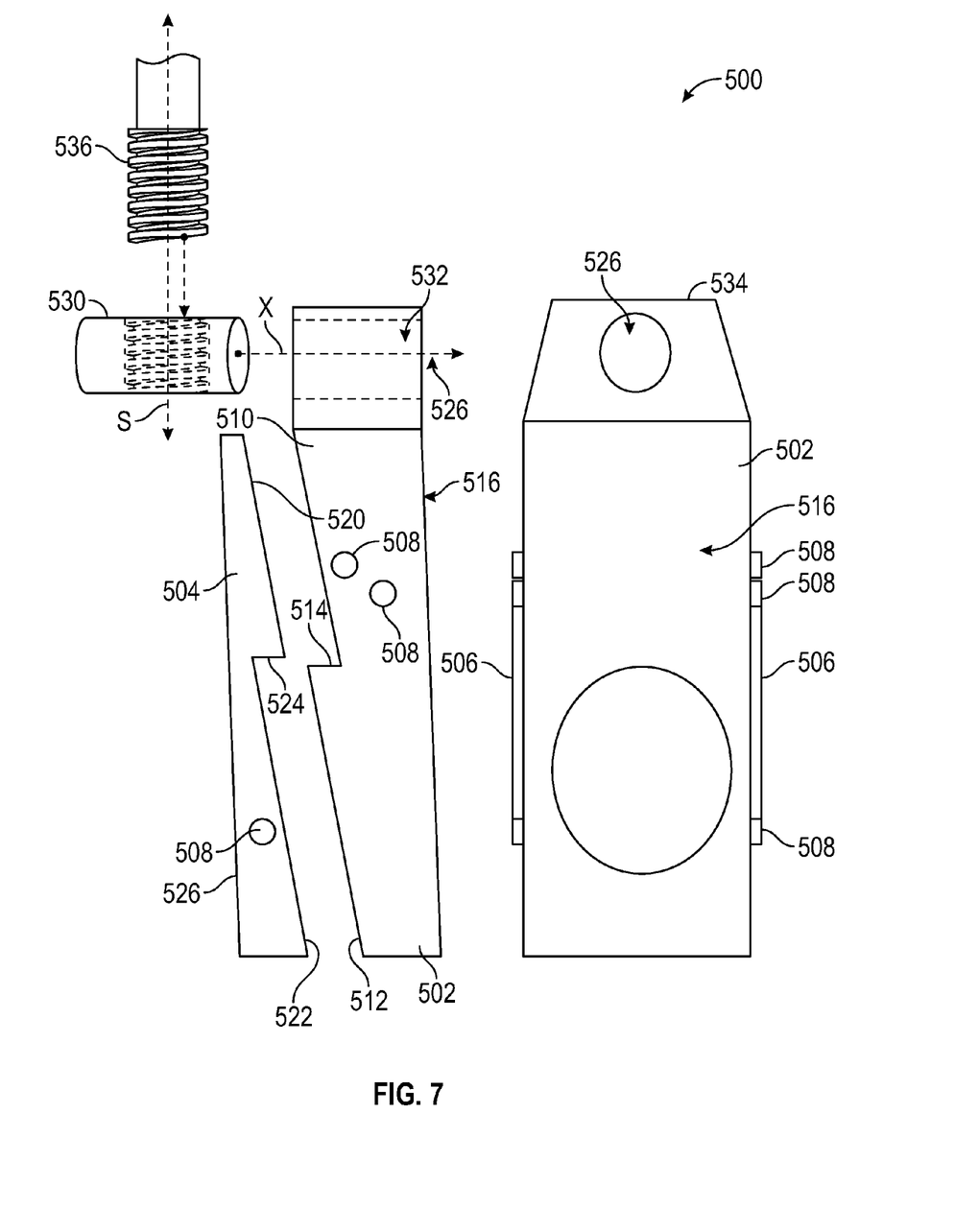
FIG. 7 illustrates an alternate configuration for an expanding gate assembly

Referring now to FIG. 7, there is an alternate embodiment of the disclosure, particularly an alternate valve assemble 500. Valve assembly 500 includes gate 502 and segment 504 having a passage therethrough and held in slidable contact by spring 506. Spring 506 couples to gate 502 and segment 504 by posts 508. Gate 502 includes an upper angled face 510, a lower angled face 512, a lift ledge 514 positioned therebetween, and an outer face 516. Segment 504 includes an upper angled face 520, a lower angled face 522, a lift catch 524 disposed therebetween, and an outer face 526.

Generally, in this configuration, the upper angled faces 510, 520 and the lower angled faces 512, 522 are in slidable contact during the closing/opening operations of a valve, such as described hereinabove. Further, during the opening or returning the valve to operation, the lift ledge 514, having an undercut surface, contacts the overhanging surface of the lift catch 524. As stated, due to thermal differential, pressure differential, or chemical adhesion, the valve seats 116 (see FIG. 1) and valve assembly 500 remain at least partially conjoined (or, stuck together). The lift ledge 514 contacts the lift catch 524 and provides additional support and mechanical motivation for the segment 504 during refraction.

Further, gate 502 of valve assembly 500 may include any slidable receiver 530 disposed in the receptor 526. As illustrated, gate 502 includes groove 532 and shoulder 534. Receiver 530 includes any means to couple gate assembly 500 to the stem 536, such as threads. Receiver 530 includes extensions that slidably contact groove 532 and shoulders 534. Further, receiver 530 may be able to pivot within groove 532. In this configuration, the receiver 530 and stem 536 may be capable of translocation relative to the gate 502 in at least two axes: sliding along axis X and pivoting therearound.

While the preferred embodiments of the disclosure have been shown and described, modifications thereof can be made by one skilled in the art without departing from the spirit and teachings of the disclosure. The embodiments described and the examples provided herein are exemplary only, and are not intended to be limiting. Many variations and modifications of the invention disclosed herein are possible and are within the scope of the disclosure. Accordingly, the scope of protection is not limited by the description set out above, but is only limited by the claims which follow, that scope including all equivalents of the subject matter of the claims.

What is claimed is:

1. An expanding gate valve assembly comprising:
a segment and a gate disposed in a valve body;
wherein the segment comprises a base surface at the lower end of the segment;
wherein the gate comprises:
an outer face and an inner face having a fluid bore therethrough;
an angled face extending from the inner face;
a receptor; and
a tab extending perpendicularly from the inner face opposite the angled face;
wherein the tab is configured to contact the base surface and to move the segment;

wherein the base surface comprises a stepped surface and a foot, and an extension of the foot is adjustable relative to the stepped surface.

2. The assembly of claim 1, wherein the receptor is disposed opposite the tab on the gate and comprises a cavity and a groove extending through the gate.

3. The assembly of claim 2, comprising a receiver slidably engaged within the groove of the receptor.

4. The assembly of claim 3, wherein the receiver is configured to couple to a stem extending into the cavity.

5. The assembly of claim 4, wherein the stem comprises a shoulder for contacting the valve body.

6. An expanding gate valve assembly comprising:
   a segment and a gate disposed in a valve body;
   wherein the segment comprises:
      an outer face and an inner face having a fluid bore therethrough;
      an angled face extending from the inner face to the outer face at a first end;
      a base surface extending from the inner face to the outer face at a second end; and
      a foot disposed on the base surface, wherein the foot is extendable from the base surface; and
   wherein the gate comprises:
      an inner face; and
      a tab extending from the inner face and configured to contact the base surface.

7. The assembly of claim 6, wherein the base surface comprises a stepped surface.

8. The valve assembly of claim 6, wherein the segment angled face is disposed at an angle with respect to the segment inner face; and
   wherein the segment angled face intersects the segment inner face at a corner.

9. The valve assembly of claim 8, wherein the inner face extends from the segment angled face;
   wherein the valve assembly further comprises a stem coupled to the gate and to the segment for movement and configured to travel along a stem axis; and
   wherein the segment inner face is parallel to the stem axis.

* * * * *